Patented Dec. 19, 1922.

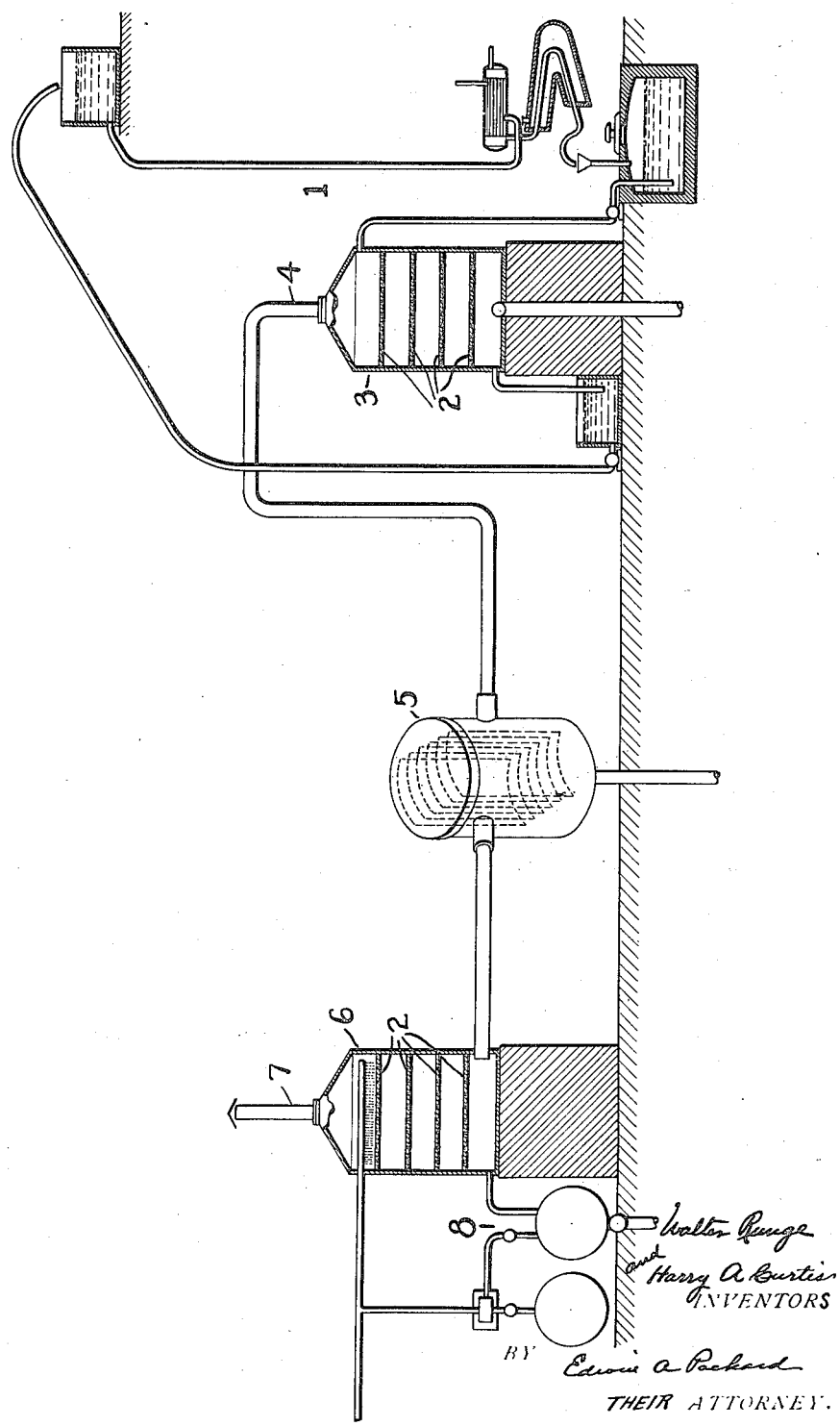

1,439,128

UNITED STATES PATENT OFFICE.

WALTER RUNGE, OF ORANGE, AND HARRY A. CURTIS, OF MAPLEWOOD, NEW JERSEY, ASSIGNORS TO BRÈGEAT CORPORATION OF AMERICA, OF WILMINGTON, DELAWARE, A CORPORATION OF DELAWARE.

RECOVERY OF PHENOL VAPORS EVOLVED FROM SOLVENT RECOVERY PROCESS, BY PHENOLATES.

Application filed August 15, 1921. Serial No. 492,280.

*To all whom it may concern:*

Be it known that we, WALTER RUNGE and HARRY A. CURTIS, citizens of the United States, and residents, respectively, of Orange and Maplewood, each in the county of Essex and in the State of New Jersey, have jointly invented certain new and useful Improvements in the Recovery of Phenol Vapors Evolved from Solvent Recovery Processes, by Phenolates, of which the following is a specification.

In United States Letters Patent No. 1,315,700, and No. 1,315,701, dated September 9, 1919, there is described, respectively, a process and an apparatus for the recovery of volatile solvents, being inventions of Jean Henry Brègeat and according to which phenols, pure or mixed with any other products or reagents, are employed for the recovery of volatile solvents. Said patents set forth that "as examples of phenolic agents may be mentioned crude carbolic acid, the residues from the distillation of mixtures of phenol and the cresols, and especially cresols of commerce."

If the Brègeat process described in said patents is properly performed, practically all of each volatile solvent (simple or mixed) can be recovered from the gaseous medium with which it is mixed or entrained, by treatment with a phenol, such as crude cresol of commerce. The gaseous medium commonly used is air. However, in performing the Brègeat process there is some loss, although comparatively small, of the phenol used as the absorbent. The main loss is due to some of the phenol (e. g. cresol) passing off in a state of vapor or otherwise with the air exit of the Brègeat system. In other words, considerable of this loss is because some cresol vaporizes and the cresol vapors become mixed or entrained with the air or gaseous medium, to wit, with the gaseous medium which formerly constituted a part of a gaseous mixture containing volatile solvent vapors, the removal of which volatile solvent vapors was accomplished by treating the mixture with the absorbent (crude cresol).

The present invention is particularly concerned with the employment of an aqueous sodium phenolate or sodium cresylate solution for the recovery or collecting of cresol vapors from the gaseous medium previously treated by cresol for the removal of vapors of volatile solvent.

The air or gaseous medium with cresol vapors entrained therein constitutes a new gaseous mixture, and according to the present invention this new mixture is brought into intimate contact with an aqueous solution of a tar acid salt, for example, sodium phenolate, which is to be broadly construed as including not only what is specifically known as "sodium phenolate" but also what is specifically known as sodium cresylate, for the purposes of this case. The said phenolates absorb and take up the cresol vapors from the new mixture.

As diagrammatically illustrating an apparatus in which the process may be carried out, reference is made to the accompanying drawing. The figure represents a diagrammatic sectional view. In said drawing 1 designates an absorbing device of the Brègeat system, as typified by either of the Brègeat patents above identified, with associated parts.

The Brègeat system partially illustrated herein, comprises an absorption column 3 with trays 2 which functions the same as and in an equivalent manner to the absorption column which trays 2 shown and described in Patent No. 1,315,700, for example. The gaseous medium after treatment with a phenol, e. g., crude cresol, for the removal of the vapors of the volatile solvents, leaves the absorption column at 4, indicated in the Brègeat patents mentioned. The gaseous medium leaving the absorption column has entrained or mixed therewith cresol—some in vapor form and some as droplets or mist—resulting from the counter current contact of the gaseous medium on the one hand, while being treated to rid it of the volatile solvent vapors, and the cresol solution on the other hand. The gaseous medium leaves the absorption column from the top as at 4 then preferably passes to a device 5 referred to herein as a cresol separator, the function of which is to eliminate the droplets of cresol from the gaseous medium. There will still remain in the gaseous medium substantially only that cresol which is in the form of vapor. From the cresol separator 5 the gaseous medium with cresol vapors remaining therein is passed to a second or auxiliary absorption column 6 which may be, as shown, similar in construction to the absorption column 3, and likewise has trays 2.

The mixture of gaseous medium and cresol vapors may enter the auxiliary absorption column 6 at the bottom and may flow upwardly therethrough in intimate contact with a downwardly flowing aqueous solution of sodium phenolate—sodium cresylate—and under conditions whereby said aqueous solution effects a removal or lapping up or absorption of the cresol vapors, thus substantially ridding the gaseous medium of said vapors. Finally, the air or gaseous medium substantially freed of cresol vapors leaves as at 7, from the top of the auxiliary absorption column 6. A circulating system as 8 may be used to effect a continuous supply of the absorbent, to wit, the aqueous solution of a sodium phenolate to the top of the absorption column 6.

In regard to the quantity of cresol vapors which can become entrained or mixed with the air or gaseous medium while in the absorption column 2, it will be noted that cresol has a vapor pressure of approximately 0.12 mm. of mercury at 20° C. This means that the actual vaporization per cubic meter of gaseous medium is approximately 0.7 gram of cresol at 20° C., in vapor form. In other words, the saturation per cubic meter of gaseous medium with cresol at the temperature specified is 0.7 gram. It is possible, however, under certain conditions, more cresol than that mentioned will be mechanically taken over in the form of droplets with the air or gaseous medium leaving the absorption column 3, and in order to eliminate the liquid droplets of the cresol there can be and often is employed with the Brègeat system the cresol separator, as 5, the function of which is to mechanically separate from the gaseous medium the liquid droplets of cresol, leaving that which is in vapor form. If the gaseous medium is passed through the cresol separator the statement that the gaseous mixture contains about 0.7 gram of cresol at 20° C., applies. In general, however, to be on the safe side, one may allow for 0.8 gram of cresol per cubic meter of gaseous medium. As previously indicated, the present invention is concerned with the recovery of this 0.8 gram of cresol per cubic meter of outgoing gaseous medium.

The method which is the basis of the present case, involves the employment for the recovery of the cresol from the gaseous medium, of an aqueous sodium phenolate solution—sodium cresylate solution, or in other words, an aqueous solution of a sodium salt of a tar acid, as the absorbing medium. This absorbent laps up or takes up the cresol vapors from the gaseous medium, when the gaseous mixture is passing through a suitable absorption device, as the column 6. Of course, in place of the particular absorption column indicated any other absorption device might be used whereby the absorbent solution is brought into intimate contact with the gaseous mixture, whereby the desired result is accomplished, to wit, taking the cresol from the gaseous mixture. This process can be continued or repeated until the absorption solution becomes saturated or has absorbed the desired amount of cresol and thereafter the absorption solution may be treated to recover the cresol therefrom; or the absorption solution may be sold with the cresol contained therein, e. g., as a disinfectant.

The process above described has been demonstrated as practical and it appears exceedingly promising for large commercial installations. It is well known that

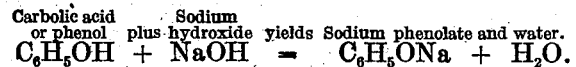

Carbolic acid or phenol plus Sodium hydroxide yields Sodium phenolate and water.
$$C_6H_5OH + NaOH = C_6H_5ONa + H_2O.$$

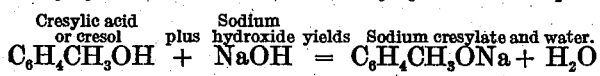

Cresylic acid or cresol plus Sodium hydroxide yields Sodium cresylate and water.
$$C_6H_4CH_3OH + NaOH = C_6H_4CH_3ONa + H_2O$$

The reaction just indicated may be expressed in a general equation as follows where $C_6H_5$ and $C_6H_4CH_3$ are designated by R—

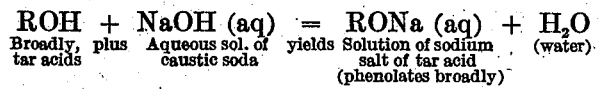

$$ROH + NaOH\ (aq) = RONa\ (aq) + H_2O$$
Broadly, tar acids plus Aqueous sol. of caustic soda yields Solution of sodium salt of tar acid (phenolates broadly) (water)

Having in mind the reactions above set forth, one in an initial or perfunctory study of the problem of recovering or obtaining cresol vapors from air or a gaseous mixture might conclude that it would be possible and practical to employ a sodium hydroxide solution as a scrubbing agent, but a further investigation and trial of such process soon brings out the fact that carbon dioxide, always present in the air, is absorbed by the sodium hydroxide, and that while the sodium hydroxide would unite with the cresol to form a sodium cresylate, still a much larger part of the sodium hydroxide unites with the carbon dioxide to form sodium carbonate; for several reasons the last mentioned process is not practical.

It has now been found that phenols—cresols—(tar acids) are soluble to a certain extent in sodium phenolate solution of any strength but when the sodium phenolate solution is made by neutralizing a sodium hydroxide solution of greater than 1.07 specific gravity the resulting sodium phenolate solution is miscible with tar acids in all proportions.

We have demonstrated that it is feasible to employ this absorbing function of the sodium phenolate solution to advantage in the recovering of the phenol-cresol-vapors from the gaseous mixture, and the present process employs the sodium phenolate solution or sodium cresylate solution—of the character specified as the absorbing agent for the phenol or cresol vapors. The sodium phenolate solution picks up much less carbon dioxide from the air than would be the case with sodium hydroxide or caustic soda.

The process herein outlined may be employed as a continuous process or as an intermittent one, as will be manifest.

It will also be noted that the invention may be realized in various ways without departure from the spirit and scope thereof.

What we claim is:

1. In the process of recovering volatile solvent vapors from a gaseous medium by cresol as an absorbing agent, the improvement which comprises causing an aqueous solution of a tar acid salt to come into intimate contact with the gaseous medium, after the removal of the volatile solvent therefrom by cresol, such gaseous medium carrying vapors of cresol taken up by the gaseous medium in such first absorption step, said treatment with the aqueous solution of the tar acid salt being carried out by causing the gaseous medium with cresol vapors carried therein, to come into intimate contact with the said aqueous solution of the tar acid salt until substantially all of the cresol vapors carried in said gaseous medium are absorbed by the said aqueous solution or tar acid salt.

2. In a process of recovering volatile solvent vapors from a gaseous medium by a phenol employed as absorbing agent, the improvement which comprises subjecting the gaseous medium, after treatment with said phenol, and while carrying vapors of said phenol, to come into intimate contact with an aqueous solution of sodium phenolate and continuing said treatment until the desired vapors of phenol are absorbed by the said aqueous solution of phenolate.

3. In a process for recovering volatile solvent vapors from a gaseous medium by absorption in a phenol, the improvement which comprises subjecting the gaseous medium, after the absorption of the volatile solvent vapors in said phenol and while carrying vapors of said phenol, to come into intimate contact with an aqueous solution of a tar acid salt, whereby the said aqueous solution absorbs vapors of phenol carried in such gaseous medium.

4. A process which comprises passing a current of a gaseous medium carrying vapors of a phenol, to intimate contact with a solution of an alkali metal salt of a tar acid.

Specification signed this 6th day of July A. D., 1921, by

WALTER RUNGE. [L. S.]

and this third day of Aug. A. D., 1921, by

HARRY A. CURTIS. [L. S.]